C. W. CRAWFORD.
VEHICLE SPRING.
APPLICATION FILED APR. 19, 1915.
1,201,153.
Patented Oct. 10, 1916.
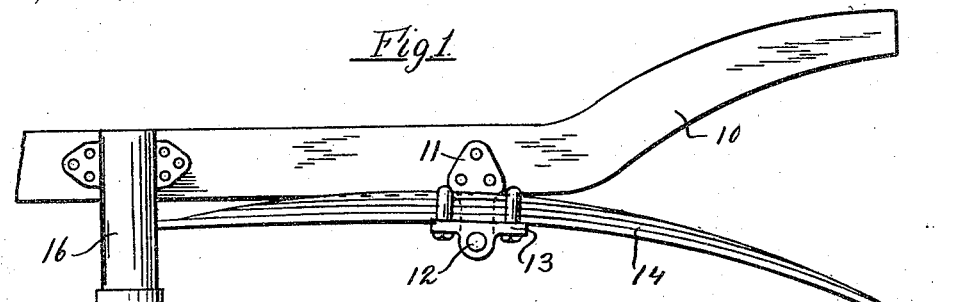
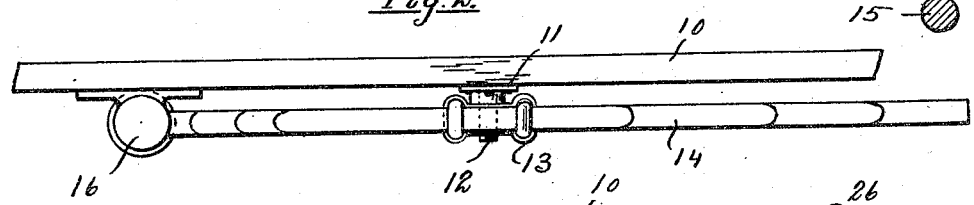
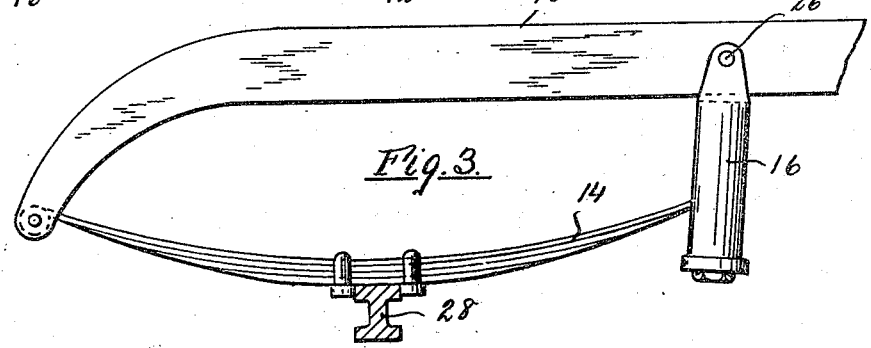
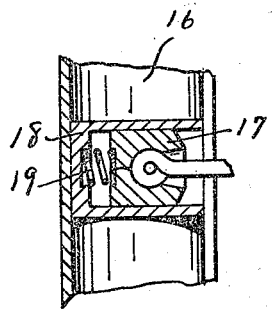
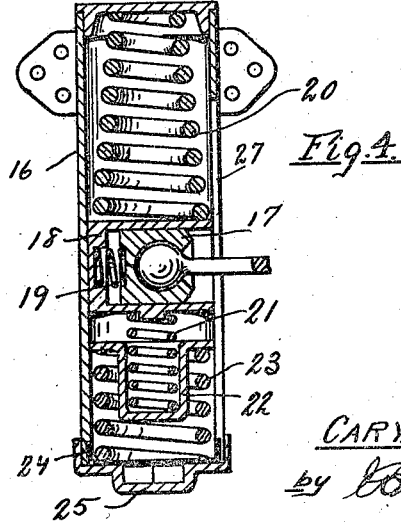
WITNESSES
INVENTOR.
CARY W. CRAWFORD.
by
ATTORNEY

UNITED STATES PATENT OFFICE.

CARY W. CRAWFORD, OF LOS ANGELES, CALIFORNIA, ASSIGNOR TO EUREKA SHOCK ABSORBER COMPANY, OF LOS ANGELES, CALIFORNIA, A CORPORATION OF CALIFORNIA.

VEHICLE-SPRING.

1,201,153.  Specification of Letters Patent.  Patented Oct. 10, 1916.

Application filed April 19, 1915. Serial No. 22,342.

*To all whom it may concern:*

Be it known that I, CARY W. CRAWFORD, a citizen of the United States, residing at the city of Los Angeles, in the county of Angeles and State of California, have invented new and useful Improvements in Vehicle-Springs, of which the following is a specification.

My invention relates primarily to springs for vehicles traveling on streets or roads and the object thereof is to provide a vehicle spring of great mobility.

A further object is to provide a spring that possesses the minimum amount of rebound action whereby the danger of breaking the spring is reduced to the minimum.

My improved spring consists of the combination of leaf and coil springs.

In the drawings forming a part of this application: Figure 1 is a side elevation of one of my improved springs showing it applied to the rear portion of an automobile. Fig. 2 is a plan of the parts shown in Fig. 1. Fig. 3 is a side elevation of my improved spring showing it applied to the front portion of an automobile. Fig. 4 is an enlarged vertical section of the casing and coil springs. Fig. 5 is a modification of the mounting of the leaf spring.

In the drawings 10 is a fragment of the rear portion of the frame or chassis of an automobile to which is secured bearing plate 11. Projecting from the lower end of plate 11 is a pin 12 on which is rockably mounted supporting plate 13. Leaf spring 14 is mounted intermediate its ends on plate 13. One end of spring 14 is mounted on the rear axle 15. The other end of spring 14 projects into the spring casing 16 in which the coil springs are carried. Within casing 16 is a split follower 17 in the center of which the end of spring 14 is received. The end of spring 14 within the follower may be globular as shown in Fig. 4, or cylindrical as shown in Fig. 5. To allow the follower to have a transverse motion as to the casing a U-shaped guide 18 straddles the follower. A spring 19 assists in holding the follower central in the guide. Within the casing and at one side of the guide is a coil thrust spring 20. On the other side of the guide is the rebound spring. Where greater mobility is desired the rebound spring is composed of a light central spring 21 which sets in a cup 22. This cup is supported by the heavy rebound spring 23 which last spring bears upon disk 24 which is placed within the casing at the end thereof to hold the casing from collapsing when nut 25 is screwed upon the casing. In springs at the rear of the vehicle the thrust springs are in the bottom of the casing and the rebound springs are in the top. In springs at the front of the vehicle the thrust springs are in the top and the rebound springs are in the bottom of the casing. If desired a single rebound spring may be used in each casing. At the rear I prefer to attach the casing rigidly to the frame. At the front I prefer to attach the casing to the frame by a pivot 26 as shown in Fig. 3 so that it may oscillate to accommodate itself to the movement of the end of the leaf spring when the vehicle passes over an obstruction. When the casing is pivotally connected to the frame follower 17 could just fit the casing and guide 18 could be omitted. A slot 27 is provided in the casing to allow for longitudinal movement of the end of the leaf spring as to the casing and for assembling. At the front the leaf spring 14 is secured near its center to the front axle 28.

From the foregoing it will be seen that one end of the leaf spring is supported by a coil thrust spring and on the other side of this end excessive rebound is prevented by suitable coil springs, thus providing a very efficient mobile spring in which the danger of breakage by rebound is reduced to the minimum.

Having described my invention what I claim is:

1. A vehicle spring composed of a leaf spring adapted to be connected at or near the center and at one end to different parts of the vehicle; and a spring connection on the other end of the leaf spring adapted to be secured to a part of the vehicle, said last spring connection comprising a casing pivotally connected to the frame of the vehicle, said casing having a slit in one side thereof; a follower within said casing in which the end of the leaf spring is received; a rebound spring on one side of said follower; and a thrust spring on the other side of said follower.

2. A vehicle spring composed of a leaf spring adapted to be connected at or near the center and at one end to different parts of the vehicle; and a spring connection on the other end of the leaf spring adapted to be secured to a part of the vehicle, said last spring connection comprising a casing pivotally connected to the frame of the vehicle, said casing having a slit in one side thereof; a follower within said casing in which the end of the leaf spring is received; a rebound spring in said casing beneath said follower whereby the rebound of the leaf spring is gradually stopped.

3. A vehicle spring composed of a leaf spring adapted to be connected at or near the center and at one end to different parts of the vehicle; and a spring connection on the other end of the leaf spring adapted to be secured to a part of the vehicle, said last spring connection comprising a casing pivotally connected to the frame of the vehicle, said casing having a slit in one side thereof; a follower within said casing in which the end of the leaf spring is received; and a thrust spring in said casing to support the load thrust on the end of the leaf spring.

4. A vehicle spring composed of a leaf spring adapted to be connected at or near the center and at one end to different parts of the vehicle; and a spring connection on the other end of the leaf spring adapted to be secured to a part of the vehicle, said last spring connection comprising a casing pivotally connected to the frame of the vehicle, said casing having a slit in one side thereof; a follower within said casing in which the end of the leaf spring is received; a guide in said casing straddling said follower; a spring in said guide bearing against said follower; a rebound spring in said casing on one side of said guide; and a thrust spring in said casing on the other side of said guide.

In witness that I claim the foregoing I have hereunto subscribed my name.

CARY W. CRAWFORD.

Witnesses:
D. P. WILSON,
HENRY LEVY.